July 15, 1969   N. ZONDAG   3,455,017
METHOD FOR WELDING TOGETHER TUBULAR CONSTRUCTION PARTS
AND TUBULAR CONSTRUCTION PARTS SO WELDED
Filed Jan. 25, 1968   2 Sheets-Sheet 1

NICOLAAS ZONDAG
INVENTOR

NICOLAAS ZONDAG
INVENTOR

United States Patent Office 3,455,017
Patented July 15, 1969

3,455,017
METHOD FOR WELDING TOGETHER TUBULAR CONSTRUCTION PARTS AND TUBULAR CONSTRUCTION PARTS SO WELDED
Nicolaas Zondag, Roosendaal, Netherlands, assignor to Ingenieursbureau Lemet Chromium H. van der Horst N.V., Willemsvaart, Zwolle, Netherlands
Filed Jan. 25, 1968, Ser. No. 700,522
Claims priority, application Netherlands, Jan. 27, 1967, 6701319
Int. Cl. B23k 29/00
U.S. Cl. 29—482                     2 Claims

ABSTRACT OF THE DISCLOSURE

A method for welding together tubular construction parts, whereby the wall surfaces to be welded together are so slantingly finished that they can overlap each other, leaving open an annular wedge-shaped space, the latter converging towards the axis of the construction parts, whereas an explosive is applied around the overlap and the welding is accomplished by ignition thereof. Between the explosive and the tubular construction parts to be welded preferably a damping cushion is applied while the detonation is tangentially initiated by a strip of explosive the detonation velocity of which is lower than a belt of explosive applied to the parts to be welded, said strip forming an angle to said belt.

---

Figure 1:
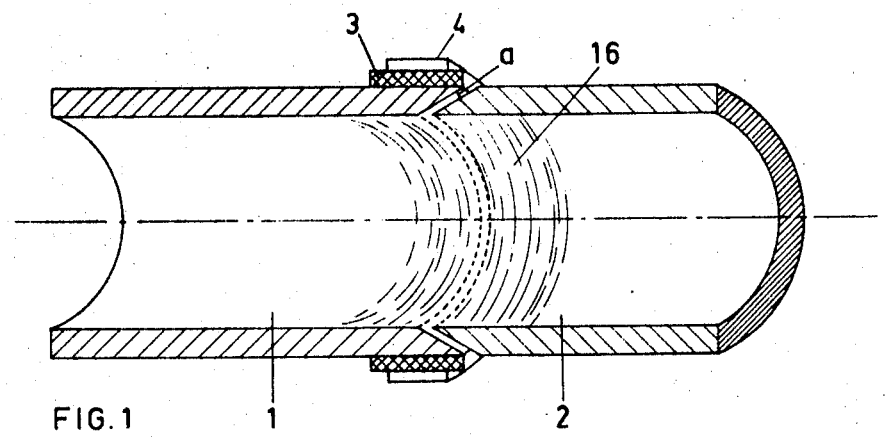

This invention relates to a method for welding together tubular construction parts and more in particular to providing a method for welding together tubular construction parts, wherein, on the score of a known principle an explosive means is employed for realizing the welding joint.

According to the invention the wall surfaces to be welded together are so slantingly finished that they are capable of partly overlapping each other, leaving open a wedge shaped space, the latter converging towards the axis of the construction parts, whereas an explosive is applied around the overlap and the welding is accomplished by ignition thereof.

Surprisingly it has been found now that in so doing a firm weld is produced having the great advantage that it need not be finished. However, finishing the surfaces to be welded together as immaculately as possible, is a condition, so that the annular, wedge shaped space has the same dimensions anywhere.

Tests have shown that in applying the invention also aluminium tubes can be welded which according to the method hitherto applied required high professional skill.

The welding of tubes in applying the invention can also be done by less trained persons, provided the pre-treatment, viz, slantingly finishing the surfaces to be welded together, be performed with the required accuracy. As a matter of fact the choice of the explosive is important as well.

When tubes of different diameter have to be welded together, the tube having the largest diameter can be slantingly finished inwardly up to the welding surface to be made later. This case could present itself when a tube has to be connected to a tubular part of a construction part.

When tubes of the same diameter have to be butt welded the head planes facing each other are slantingly finished, while passing in the same direction. In this way the desired wedge shaped space is formed, around which the explosive is applied. After the welding the inner pattern of the tube remains perfectly smooth whereas the outer pattern practically does not deviate from the original one.

In order to avoid as much as possible an inwardly directed deformation the use of a mandrel is to be recommended, which mandrel should be of the expandable type for its easy introduction into the tube to be welded and/or for removing it from this latter after welding. In butt welding tubes, also a sleeve can be employed which at both ends has been widened in such a manner that a wedge shaped space is left between the outer wall of each of the tubes and the inner wall of the sleeve end. Then the explosive is applied about in the center of the sleeve and after ignition and combustion of the explosive the sleeve will be pressed around the tubes on both sides.

When it is the intention to overlappingly weld tubes having the same diameter, preferably one of the tubes is widened at its end, so that it is capable of partly overlapping the other tube, leaving a circular wedge shaped space. Also in this case the explosive is applied around the outer tube end and after ignition and combustion of the explosive the outer tube will be pressed against the inner tube.

As already observed the method of the invention is particularly suitable for welding relatively soft metals, such as aluminum, copper etc. In such a case it is recommendable to apply a damping cushion, e.g. of rubber, under the explosive.

Figure 2:
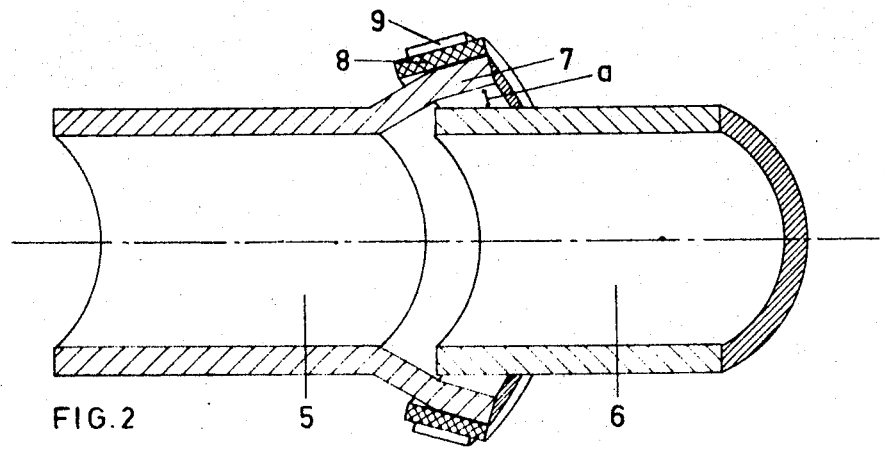
Figure 3:
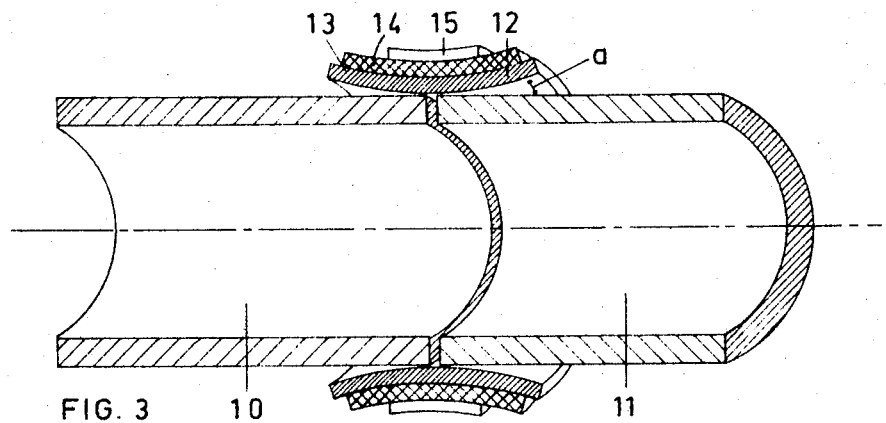
Figure 4:
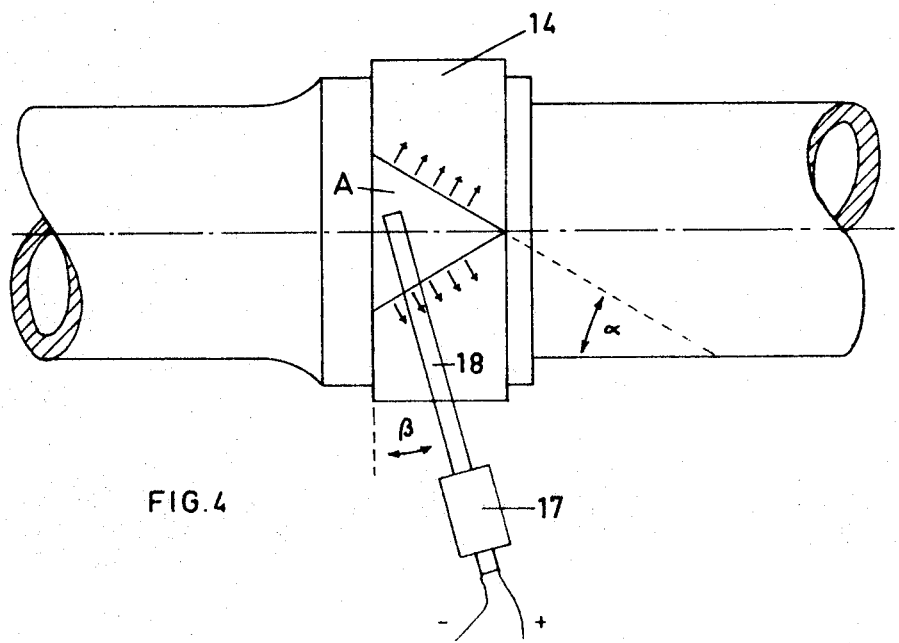

The invention will be further explained now with the help of the drawing in which:

FIG. 1 shows schematically a portion of a tube line which is welded in applying the invention;

FIG. 2 the manner in which an overlapping weld is made;

FIG. 3 a tube joint, being made in applying a sleeve;

FIG. 4 a top view of the tube joint prior to the welding; and

Figure 5:
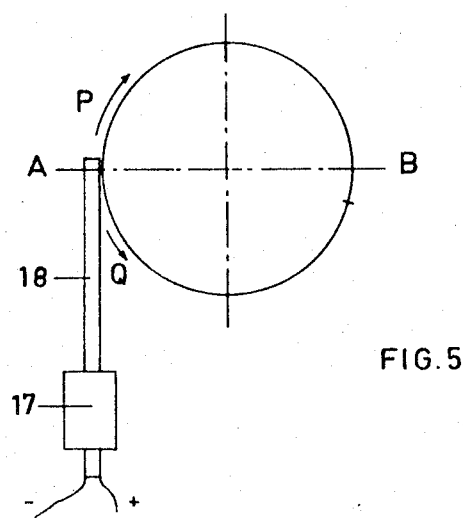

FIG. 5 a schematic cross-section.

In FIG. 1 portions of a tube line to be welded together are represented by 1 and 2. The head planes of the tube portions facing each other are slantingly finished up to the welding surface to be made and this so that a wedge shaped space $a$ is formed therebetween. Around the so overlapping portion of the tubes 1 and 2 a belt of explosive 3 is applied to which a detonating means 4 is provided. By igniting this latter such a force is developed that the tube portions 1 and 2 are welded together in an efficient and quick way. The number 16 indicates schematically a mandrel which prevents the inner diameter of the tube line from changing during the welding. As tests have shown, after the welding also the outer diameter of the tube line at the location of the weld will only slightly deviate from the original diameter. The mandrel 16 is preferably of the expandable type, i.e. it can be easily moved inside the tube up to the location of the weld whereafter the mandrel 16 increases in diameter, properly abutting against the inner wall of the tube portions 1 and 2. After the welding the diameter of the mandrel 16 is reduced again so that it can easily be removed from the then welded tube line.

When it is the intention to weld tubes overlappingly the end of the tube portion 5 to be welded to the tube portion 6 is widened at 7, as shown in FIG. 2, so that a wedge shaped space $a$ is left.

Around the overlapping portion 7 a belt of explosive 8 is applied together with the detonation-cord 9 and after ignition of the same the welding will take place. Here also a perfect weld is the result which incidentally need not be finished.

It is important however that the planes of the tube ends to be welded facing each other are highly finished. Also in the case of FIG. 2 a mandrel 16 will be employed which latter will be removed again from the tube line after the weld is completed.

For butt welding two tubes of equal diameter also a sleeve joint as shown in FIG. 3 can be used. A sleeve is applied around the tube portions 10 and 11 the ends 12 and 13 of which are so widened that a wedge shaped space $a$ remains at both sides. A belt of explosive 14 with a detonation-cord 15 is applied around the sleeve and after ignition of said cord 15 the welding occurs. Here also an expanding mandrel 16 is preferably employed so that the inner pattern of the tube line 10/11 will not or will not appreciably be changed.

As hard sorts of metal have to be welded the explosive 4, 8, 14, may be directly applied to the material to be welded as shown in FIGS. 1–3. For soft sorts of metal such ts aluminum or copper, it is desirable to arrange a damping cushion e.g. a rubber strip between the product to be welded and the explosive.

The most ideal situation would be when the detonation of the explosive would take place in axial direction. For the time being this cannot be realized in practice. In case, as shown, the belt of explosive is applied around the product to be welded the detonation will take its way along the circumference and this may cause serious damages. For in that case there is the great risk of both circulating detonation fronts P and Q (see FIG. 5) meeting at B opposite point A where the detonation is initiated. For obtaining the favourable condition earlier referred to a declining detonation front is provided to as schematically shown in FIG. 4. The belt of explosive 14 is initiated by a strip of explosive having a low detonation velocity which strip 18 forms an angle $\beta$ to the longitudinal axis of the belt 14. The initial path of the detonation is shown by arrows in FIG. 4.

During the welding process fluid metal oxide plus pollutions of the metal surface are now propelled ahead of the detonation front. By favourably selecting the angle $\alpha$, care can be taken that these pollutions are axially expelled from and outside the weld. The ignition of the process occurs by an electric ignition 17.

I claim:
1. A method for welding together construction parts of tubes comprising providing a slanting finish to the wall surfaces of said tubes to be welded together, widening one of said tubes at an end so that it is capable of partly overlapping the other tube leaving a circular, wedge shaped space, converging said space towards the axis of said construction parts, applying an explosive around said overlapping surfaces, tangentially initiating the detonation of said explosive to accomplish the welding by a strip of explosive whose detonation velocity is lower than said explosive applied to the parts to be welded, said strip forming an angle to said explosive applied to the parts to be welded.

2. A method as set forth in claim 1 wherein the reaction between said explosive and said construction parts is dampened.

References Cited

UNITED STATES PATENTS

| | | | |
|---|---|---|---|
| 3,229,364 | 1/1966 | Thomas et al. | 29—421 |
| 3,261,088 | 7/1966 | Holtzman | 29—486 |
| 3,263,323 | 8/1966 | Maher et al. | 29—470.1 |
| 3,258,841 | 7/1966 | Popoff | 29—497.5 |
| 3,292,253 | 12/1966 | Rossner et al. | 29—421 |
| 3,313,021 | 4/1967 | Wright et al. | 29—421 |

JOHN F. CAMPBELL, Primary Examiner

P. M. COHEN, Assistant Examiner

U.S. Cl. X.R.

29—421, 470.1, 497.5